United States Patent [19]

Reinertz et al.

[11] 4,185,522
[45] Jan. 29, 1980

[54] PROCESS FOR SETTING AN INCISION DEPTH IN STRIPPING ELECTRICAL CONDUCTOR WIRES AND A DEVICE FOR EXECUTION OF THE PROCESS

[75] Inventors: Rudolf Reinertz; Wolfgang Born, both of Wuppertal, Fed. Rep. of Germany

[73] Assignee: Grote & Hartmann GmbH & Co. KG, Wuppertal, Fed. Rep. of Germany

[21] Appl. No.: 860,762

[22] Filed: Dec. 15, 1977

[30] Foreign Application Priority Data

Dec. 16, 1976 [DE] Fed. Rep. of Germany ....... 2656938

[51] Int. Cl.² ............................................. H02G 1/12
[52] U.S. Cl. .................................................. 81/9.51
[58] Field of Search ................... 81/9.5 R, 9.5 A, 9.51

[56] References Cited
U.S. PATENT DOCUMENTS

| | | | |
|---|---|---|---|
| 3,895,426 | 7/1975 | Papsdorf | 81/9.51 X |
| 3,915,037 | 10/1975 | Wiener | 81/9.5 A |
| 3,939,552 | 2/1976 | Hart et al. | 81/9.51 X |
| 4,072,069 | 2/1978 | Bieganski | 81/9.5 A |
| 4,099,428 | 7/1978 | Senior et al. | 81/9.51 |

Primary Examiner—James G. Smith
Attorney, Agent, or Firm—Friedman, Goodman & Teitelbaum

[57] ABSTRACT

A process for setting an incision depth in stripping electrical conductor wires including an automatic scanning system to obtain a value corresponding to an outside diameter of the conductor wire to be stripped, and an automatic adjustment system to adjust the impact of the stripping according to the scanning value, and a device for carrying out the execution of this process. The scanning system is performed by clamping jaw elements of the insulation stripping device. The adjustment system includes a coupling system connected to the clamping jaw elements, a lever system reacting to the coupling system, and a double wedge arrangement having a stop wedge which is shifted accordingly by the lever system. A counter-wedge coacts with the stop wedge, where these wedges preferably are formed with an angle of 15°. The wedge surface of the stop wedge is provided with a barb-shaped dentation and is fabricated from steel, where the counter-wedge is fabricated from plastic. Preferably, the lever system has a ratio of 1 to 11.25.

13 Claims, 47 Drawing Figures

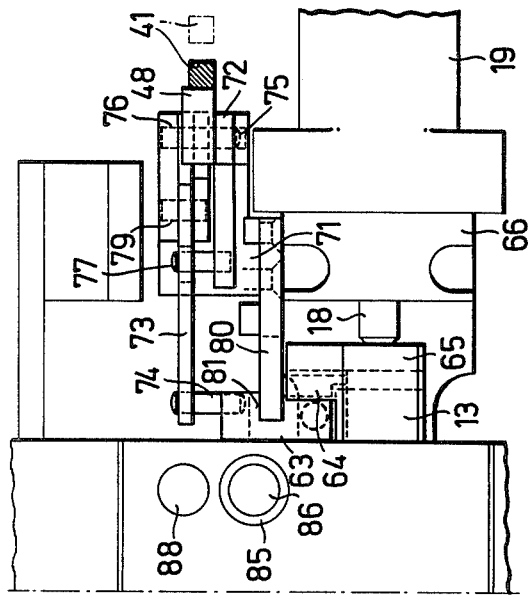
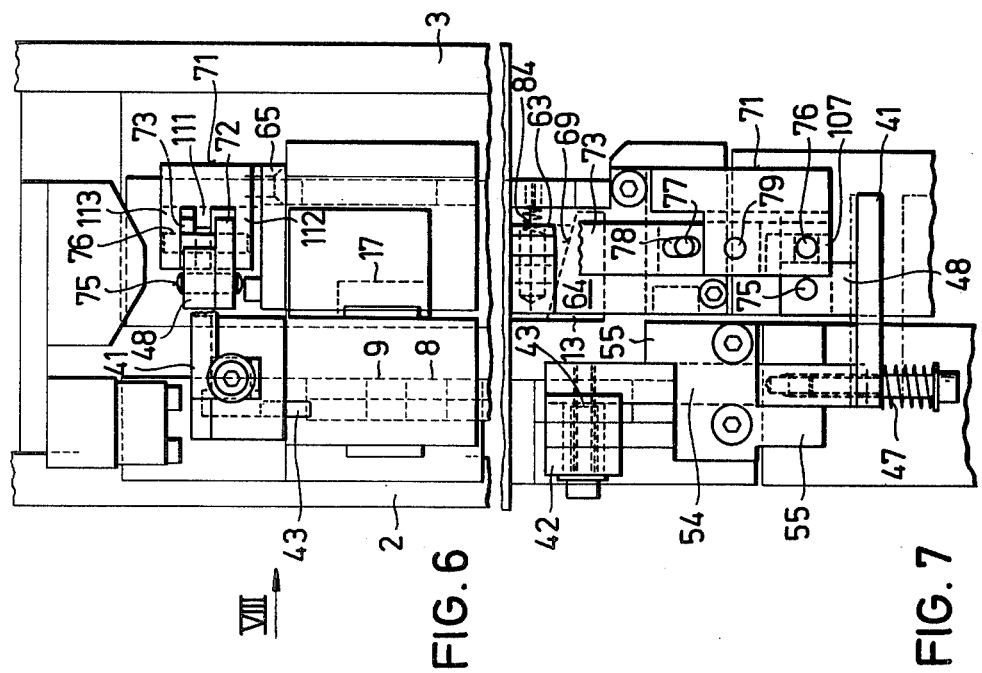
FIG. 8
FIG. 6
FIG. 7

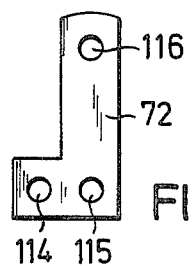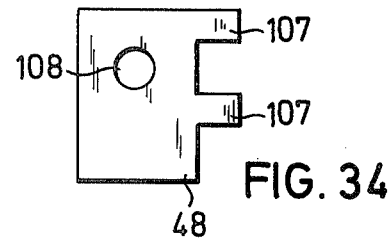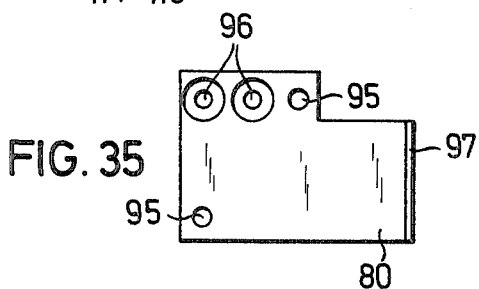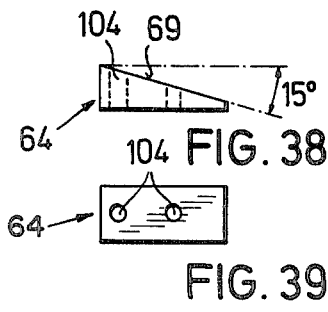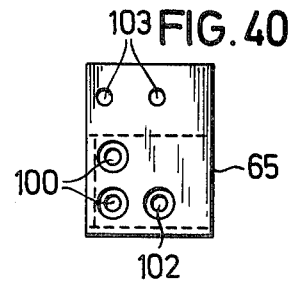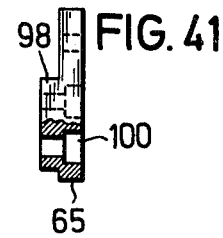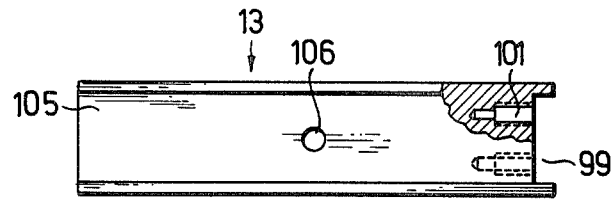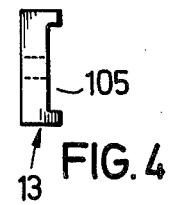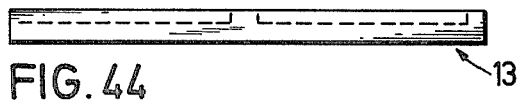

PROCESS FOR SETTING AN INCISION DEPTH IN STRIPPING ELECTRICAL CONDUCTOR WIRES AND A DEVICE FOR EXECUTION OF THE PROCESS

BACKGROUND OF THE INVENTION

The present invention relates to stripping electrical conductor wires, and more particularly to a process for setting an incision depth in the stripping and a device for execution thereof.

Known processes for stripping electrical conductor wires operate as a rule with two blades, with one blade being moved relative to the other rigidly arranged blade, or else both blades being moved relative to one another. The movement of the blade or blades yields a closing movement in which the edges of the blades penetrate into the insulation of the conductor wire and thus sever the insulation. Accordingly, it is essential that the incision depth be adjusted in such a way that the insulation is completely severed without damaging or cutting the conductor wire. The adjustment of the incision depth takes place, according to the known process, with a stop against which one blade or both blades abut during the closing movement. As a rule, the stop is connected with a setting screw that is preset by hand.

The prior art adjustment of the incision depth is inexact and requires a high degree of skill on the part of the operating personnel if it is to be carried out with as little error as possible.

Stripping devices are laid out, as a rule, in such a manner that they can strip certain types of electrical conductor wire, for example electrical conductor wires for the wiring of motor vehicle electrical systems.

The conductor wires of a certain type or of a certain nature are standardized and are distinguished by the cross section of the metal wire and the thickness of the insulation. The manual adjustability of the incision depth of some known devices is laid out for these above distinctions. If, however, the device is to be reset for a conductor wire of thinner or thicker cross section, which may frequently occur, then there is required an adjustment of the stop of the new cross section. This is time-consuming and requires, as mentioned above, considerable skill of the personnel. For this reason, in many cases, for every conductor cross section to be treated, there is acquired a separate device which is set once and remains unaltered.

The known stop elements, in which the closing movement is limited with a setting screw, cannot assure any constant incision position of the blades, because through jarrings of the device, the setting elements may loosen and shift. In this latter case, the operating personnel, after a certain working time, must check the adjustment of the stop.

SUMMARY OF THE INVENTION

The purpose of the present invention is to provide a process in which the incision depth is automatically and very accurately set for the thickness of the insulation. It is a further purpose of the present invention to provide a device for the execution of the process which operates reliably, and which is to be distinguished by a simple, especially compact manner of construction.

Accordingly, it is an object of the present invention to provide an improved process for setting the incision depth in stripping electrical conductor wires and a device for the execution thereof which avoids the aforementioned problems of the prior art.

The prior art problems are solved, according to the present invention, by a process for setting the incision depth in the stripping of electrical conductor wires in which at least one blade element moves against a stop, and which is distinguished from the prior art in that the outside diameter of the conductor wire is automatically obtained before the incision of the insulation. The measurement value of this outside diameter is transmitted to an adjusting system which automatically adjusts the stop in correspondence to the measurement value.

Underlying the present invention is the insight that the known standardized conductor-wire or cable types follow a certain function, as a rule a linear function between the diameter or the cross section of the metal wire and the insulation thickness, and thereby the outside diameter of the conductor wire. Thus far it is possible, through the measurement of the outside diameter differences of the conductor wire or cable, to transmit the incision depth for each type of conductor wire or cable to an automatically operating adjusting system. In this connection, it is taken into consideration that the differences in the thickness of the insulation in certain cable types are mostly extremely slight and can lie in the tenths of a millimeter range, so that in the transmission of the measurement values, a translation is required in order to achieve a sufficient accuracy of adjustment.

The measuring of the outside diameter can take place optically with photoelectric cells or hydropneumatically with pitot tubes which transmit the measurement value, after corresponding translation, as a pulse to a servo motor. The servo motor, on its part, alters the stop in such a way that the corresponding blade element can travel more or less distance within a prescribed stroke before it abuts on the previously adjusted stop.

Accordingly, in a special form of the present invention, the outside diameter of the conductor wire is mechanically scanned. In this form, there are preferably used oppositely running clamping jaws of a stripping device where the closing position, after the clamping fast of the conductor wire, serves as the measurement value. According to another preferred form of the present invention, the movement of the clamping jaw elements is mechanically coupled with an adjusting arrangement and the adjusting movement of the stop is mechanically transmitted over a lever system. The latter form has the special advantage in that slight fluctuations in the thickness of the insulation are translated correspondingly to the lever system, whereby there is yielded a longer shifting path of the stop. Further, the direction of movement of the coupling elements can be translated into a horizontally perpendicular movement with a considerably greater path.

Preferably, the adjustable stop is a rectangular wedge having a certain wedge angle, which is moved by the lever system parallel to the base surface. Against this wedge, there runs a rectangular counter-wedge of the blade elements, with the counter-wedge having the same above mentioned wedge angle. Through the striking of the blade element wedge on the stop wedge, the incision movement of the blade is stopped. The wedge angle of the stop wedge, in cooperation with the translation ratio of the lever system, determines the incision depth. These values are to this extent exactly attuned to one another. It is important that the two wedges inhibit each other on engagement, so that a slipping of the wedges is avoided.

The length of the wedge, the wedge angle and the translation ratio are dependent on the conductor wire type that is to be treated with the insulation stripping device.

A further object of the present invention is to provide an arrangement for the execution of the process of the present invention having stop elements for the limitation of the blade stroke, being characterized by a coupling system, a lever system and a double-wedge system, in which the coupling system preferably stands in connection with the clamping jaw system of the stripping device, and on the lever system there being arranged a wedge-shaped shiftable stop to which there is allocated a counter-wedge of the blade elements.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 6 is a partial view of FIG. 3 showing the arrangement for adjusting the incision depth;

FIG. 7 is a plan view of the arrangement shown in FIG. 6;

FIG. 8 is an elevational view taken in the direction of arrow VIII of FIG. 6;

FIGS. 12 to 46 show elements of the arrangement for adjusting the incision depth.

In the various figures of the drawings like reference characters designate like parts.

DETAILED DESCRIPTION OF THE PREFERRED EMBODIMENT

Figure 1:
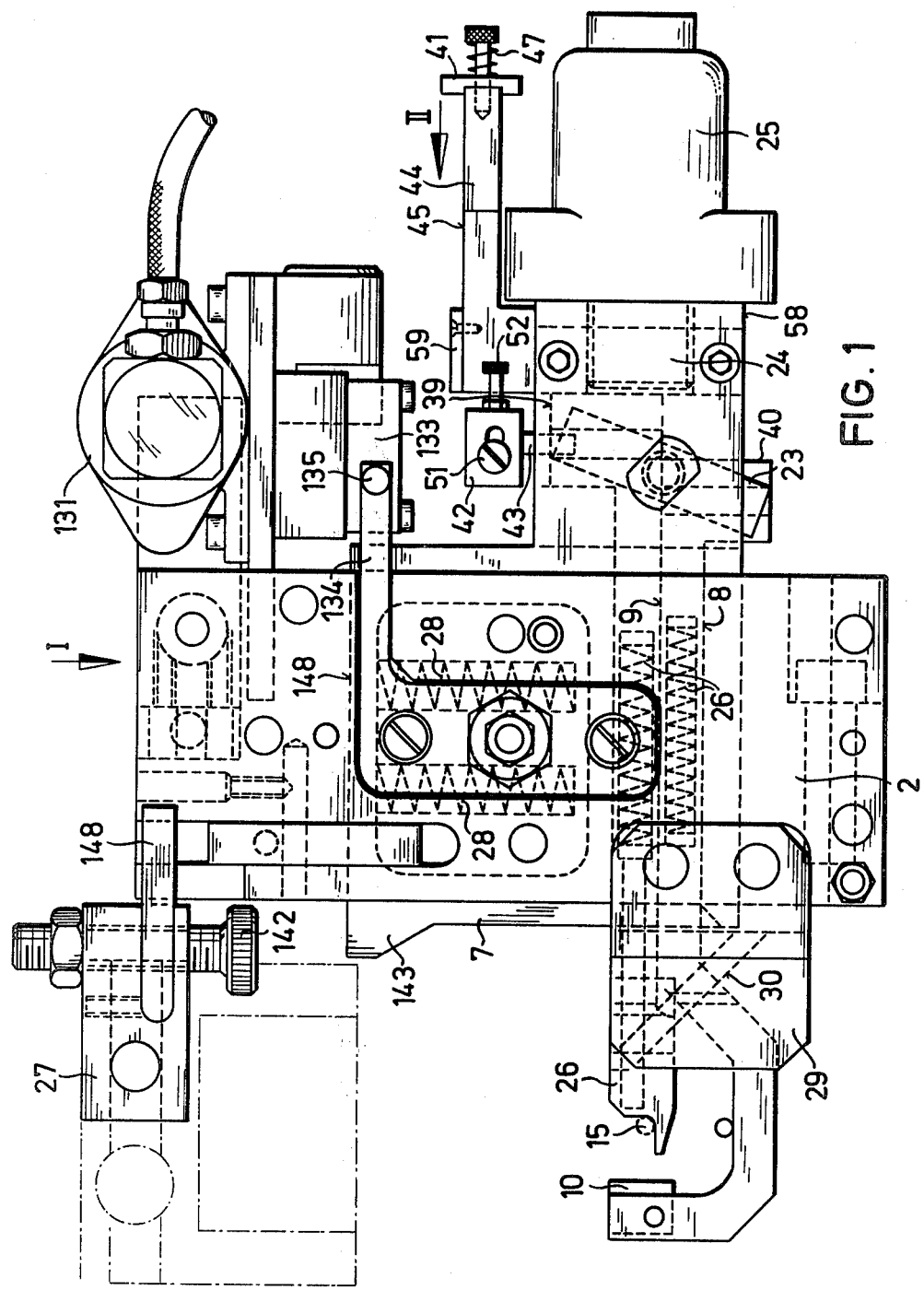
FIG. 1 shows a front view of the stripping device, according to the present invention.

The stripping device shown in FIGS. 1 to 5 can be secured to a machine stand (not shown) of a conventional pin stenter. It consists essentially of a casing base body 1, which has a double-T-shaped form. On the ends of the horizontal T-shanks, there are fastened a front casing closure plate 2 and a rear casing closure plate 3 using screws 4. The vertical T-shank of the casing base body 1 when secured with the casing closure plates 2, 3, in each case, form a chamber 5, 6.

In the chamber 5, a block 7 is guided for movement up and down. This block 7 bears two slide pieces 8, 9 which are slidable oppositely to one another in a back and forth direction, where they bear in each case on the front end a clamping jaw 10, 11.

In the chamber 6, there is accommodated a stripper block 12 which is guided in a back and forth direction between the vertical T-shank of the casing base body 1 and the rear casing closure plate 3. The stripper block 12 receives a blade slide piece 13 which can slide back and forth horizontally perpendicularly to the direction of movement of the stripper block 12. The blade slide piece 13 carries on its front end a blade 14. On the blade 14, there is allocated an arrangement according to the present invention for the adjustment of the incision depth, which is explained in detail below.

The stripping device represented has two insulation-severing blades, namely a blade 14 movable back and forth horizontally and a stationary counter-blade 16, as well as two clamping jaws 10, 11 for holding a wire 15 during the stripping process thereof, and an arrangement described below for stripping off the insulation of the wire 15.

The blade 14 is connected to the front end of the blade slide piece 13, the blade slide piece 13 being borne in a groove 17 of the stripper block 12. Against the rearward end of the blade slide piece 13, there acts a piston 18 of a pneumatic or hydraulic cylinder 19, as shown in FIGS. 8-11, which moves the blade 14 in the direction of the counter-blade 16 and withdraws it again into the starting position.

The rigidly mounted counter-blade 16 has an oblong hole 20, the front edge of which is formed as a V-shaped edge 21. The blade 14 likewise has on its free front end a V-shaped edge 22. In the closing movement of the blade 14, the blade edges 21, 22 form a square edge opening which is reduced proportionally to the closing movement.

The clamping jaws 10, 11 are each fastened to an associated one of the horizontally reciprocable slide pieces 8, 9, which are moved oppositely to each other by means of a slide block guide 23, so that the clamping jaws execute a closing movement until they clamp the wire 15 between them. For the movement of the jaws, a piston 24 of a pressure cylinder 25 acts on the end part of the slide piece 9 and the return movement takes place by springs 26a.

A wire support 26, which is arranged in front of the clamping jaws 10, 11, makes possible the centrally setting-in of an end of the wire 15 to be stripped. It permits the guidance of the wire end in the setting-in position, so that a crooked or uneven cut edge of the insulation of the wire 15 is avoided. The wire support 26 slides in an obliquely downward-directed movement from the wire introduction zone at the jaws 10, 11 when the block 7 is acted upon vertically by the pressure body 27, which is arranged on the pin stenter (not shown), where the pressure body 27 travels vertically downward. Thus, the block 7 is pressed perpendicularly downward against the force of the springs 28, the block 7 carrying the clamping jaws 10, 11 with their guide slide pieces 8, 9 and the appertaining piston-cylinder arrangement 24, 25 down with it. The wire support 26 slides out of the wire introduction zone with a movement directed obliquely downward, because it has a guide pin engaging the casing part 29 in a correspondingly arranged guide groove 30.

If the wire 15 to be stripped is introduced over the wire support 26 into the device and thrust through the oblong hole-type recess 20, then the wire end strikes an angle lever 32 swingable about an axis 31. The angle lever 32 acts on by a rod 34 having free reciprocable movement in a guide 33, which rod 34 is connected to a bending spring 36 arranged on an end switch 35, by a bridging member 37 arranged between the rod end and the bending spring. The impinging of the wire end on the angle lever 32 causes the lever 32 to swing about the axis 31, so that the lever 32 moves the rod 34 in arrow direction 38 and thereby against the force of the bending spring 36 to thus close the electric contacts of the end switch 35. Accordingly, the cylinders 19 and 25 are activated to cause the appertaining pistons 18 and 24 to move out and thus move the clamping jaws 10, 11 toward one another to clamp the wire 15 securely while the blade 14 is being moved in the direction of the V-shaped edge 21 of the counter-blade 16, so that the edges 21, 22 of the blades 14, 16 sever the insulation of the wire 15 perpendicularly to the axis of the wire.

The stripping device is equipped with an arrangement, according to the present invention, for the automatic adjustment of the incision depth, which cooperates with the movable blade 14. In the example of execution represented for the adjustment of the incision depth, the outside diameter of the wire 15 to be stripped is scanned, with the clamping jaws 10, 11 serving as sensing members. They have accordingly a double function, namely scanning and clamping the wire 15. This scanning arrangement is coupled with a coupling system (A) and a lever system (B), the latter acting on a double-wedge system (C). The particular wedge position determines the end of the stroke movement of the blade 14. If the cylinder 25 is activated by the end switch 35, the piston 24 travels against the rear end piece 39 of the slide piece 9 and moves this in correspondence to its guide. Since the slide piece 8 is joined by the slide block guide piece 23 to the end piece 39, the clamping jaws 10, 11 move toward one another until they encounter the wire 15 and clamp the wire 15 firmly between them.

The stroke movement of the slide piece 9 is transferred to the coupling system (A). For this purpose, a carry-along block 42 carries on the other side thereof a carry-along pin 43 which engage its free end in a corresponding reception opening provided in the slide piece end part 39, being secured therein. In the carry-along block 42, there is fastened at one end a guide rod 44 which is guided in a guide casing 45. The other end of the rod 44 is provided with an enlarged portion 46 which carries the setting lever 41. The setting lever 41 is L-shaped and is screwed, at its short shank, at a right angle to the enlarged portion 46 of the guide rod 44. The fastening is made springy by a pressure spring 47 arranged between the screw head and the outer surface of the setting lever 41, which spring can be a spiral spring or, as represented, a plate spring pack. The setting lever 41 transfers a part of the stroke movement of the piston 24, or of the jaws 10, 11, to the lever system (B), as it travels against a pressure piece 48 of the lever system. In an idling stroke, if no wire is clamped between the clamping jaws 10, 11, the setting lever can swing out or yield to the rear by reason of the spring 47.

Figure 9:
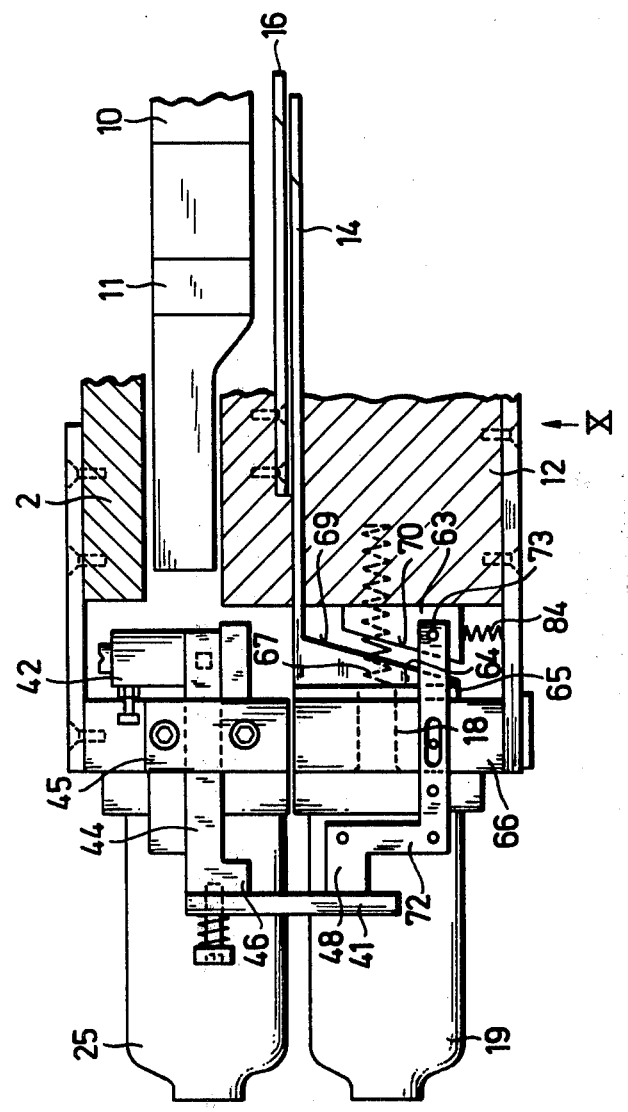
FIG. 9 is a plan view, partly in section, of the arrangement for the incision depth adjustment.
Figure 17:
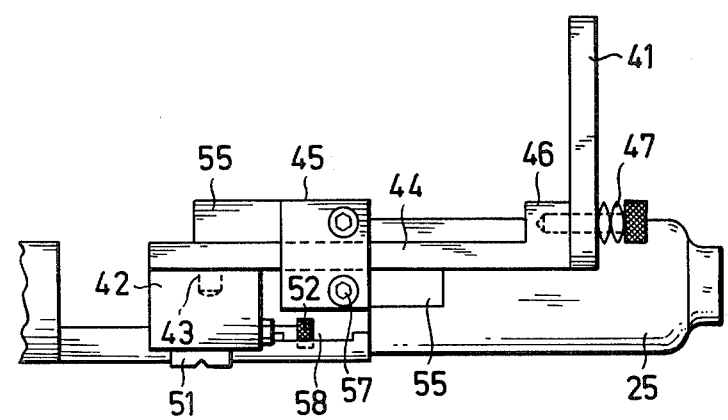
Figure 18:
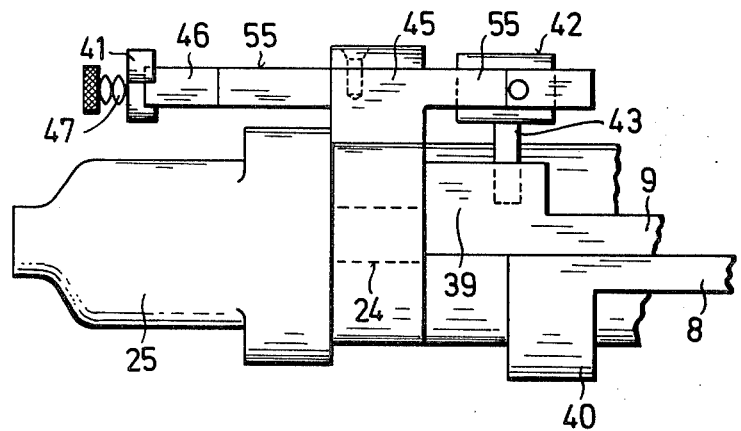
Figure 21:
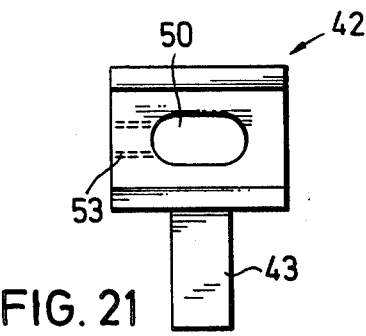
Figure 22:
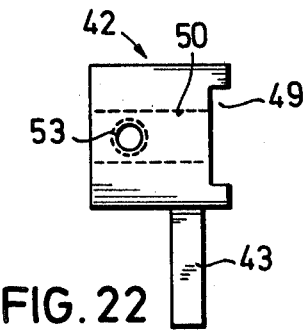
Figure 23:
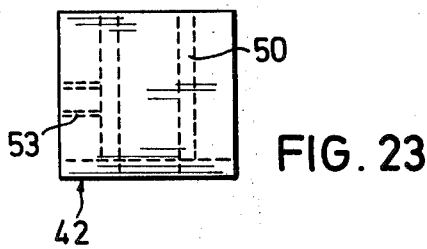

The scanning arrangement, which consists essentially of the clamping jaws 10, 11, the slide piece 8, 9 as well as of the coupling parts 41 to 47, is shown in FIG. 1 in side view. FIG. 9 in conjunction with FIGS. 7 and 17 clarify a plan view, FIGS. 3 and 6 a front view, and FIG. 18 shows a side view turned away from FIG. 1 of the scanning arrangement. The carry-along block 42 with carry-along pin 43 is represented in detail in FIGS. 21 to 23. The block 42 has a continuous U-shaped groove 49, into which the guide rod 44 engages in closed linkage. The bottom of the groove 49 has an oblong hole 50, which is traversed by a screw 51 (FIG. 17). The screw 51 is seated in a threaded bore of the guide rod 44. The oblong hole 50 makes possible a relative shifting of the guide rod 44 to the carry-along block 42, and thereby an adjustment can be made. The particular setting can be maintained by means of a counter-screw 52. The counter-screw 52 is seated in a threaded bore 53 of the carry-along block 42 and engages perpendicularly on the shaft of the screw 51.

Figure 27:
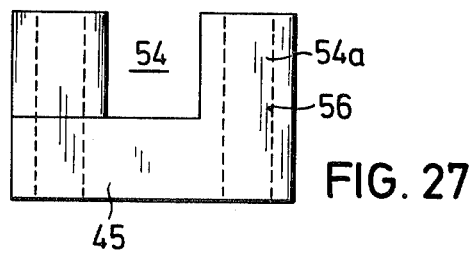
Figure 28:
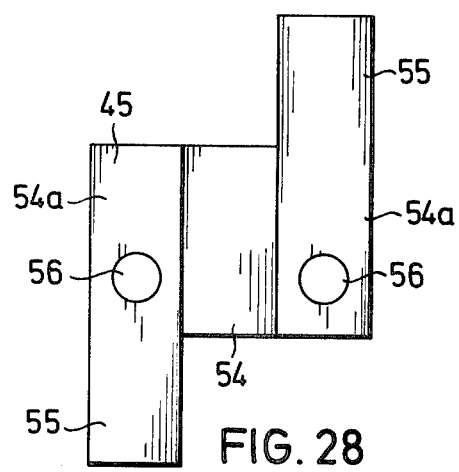
Figure 29:
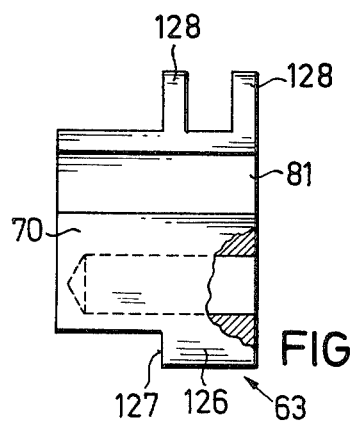

In FIGS. 27 and 28 the guide casing 45 is represented in front view and plan view. It is U-shaped in front view and has a continuous groove 54 in which the guide rod 44 is slidable back and forth horizontally. An additional guide, which is to absorb increased torques is represented by the guide crosspieces 55 which are arranged in a plane diagonally oppositely on the guide casing 45. Two bores 56 cut into the U-crosspieces 54a serve for the leading-through of fastening screws 57, in order to secure the guide casing 45 in screw fashion to the cylinder fastening piece 58 which carries the cylinder 25 and is rigidly joined with the block 7. The guide casing 45 is closed by a cover 59 which is secured thereto by the screws 57.

Figure 45:
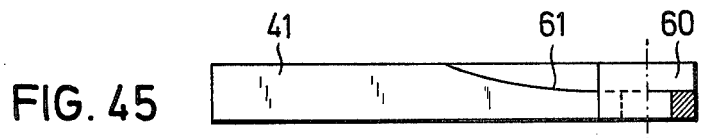
Figure 46:
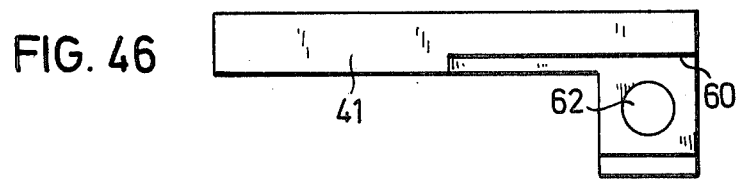

FIGS. 45, 46 show the setting lever 41 from underneath and in side view. The lever 41 has an L-shaped formation with a U-shaped groove 60 in the short shank, which serves for the reception of the enlarged end part 46 of the guide rod 44. The groove 60 runs out in an arc 61 in the long shank. A bore 62 in the short shank serves for the lead-through of a fastening screw which is screwed into the enlarged portion 46 and acts against the spring 47.

As is to be seen especially from FIGS. 7 and 9, the setting lever 41 engages, in its stroke movement brought about by the piston 24, on the pressure piece 48 of the lever system (B). Thus, a part of the stroke movement of the clamping jaws 10, 11 is transmitted over the coupling system (A) to the lever system (B), which shifts the double-wedge system (C), as the stroke movement of the setting lever 41 is transferred to the pressure piece 48 and the lever system (B) with a translation of the stroke passing to a stop wedge 63, which is slidable perpendicularly to the direction of movement of the piston 18, the blade 14 and the clamping jaws 10, 11.

Figure 10:
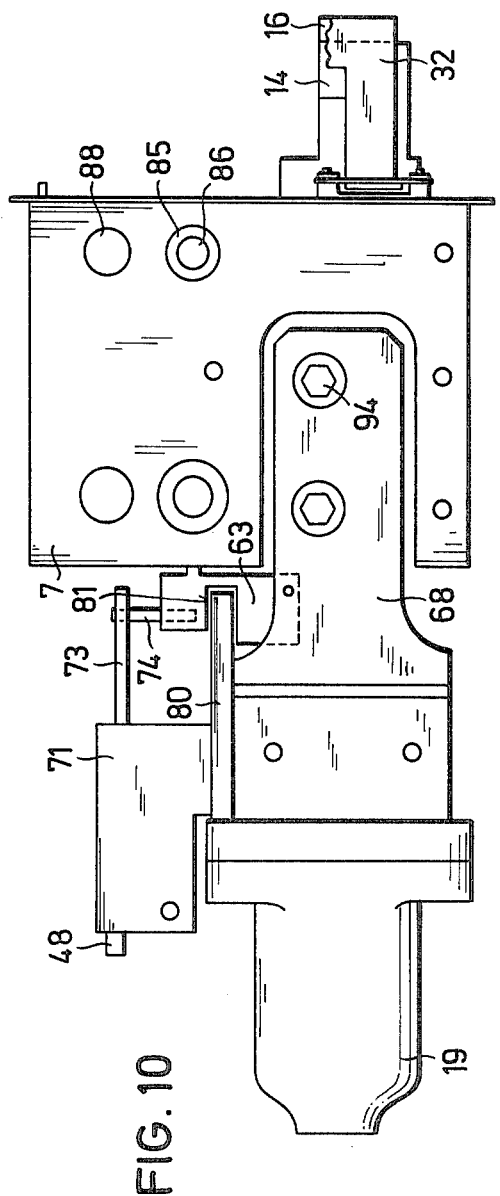
FIG. 10 is a view taken in the direction of arrow X of FIG. 9.
Figure 11:
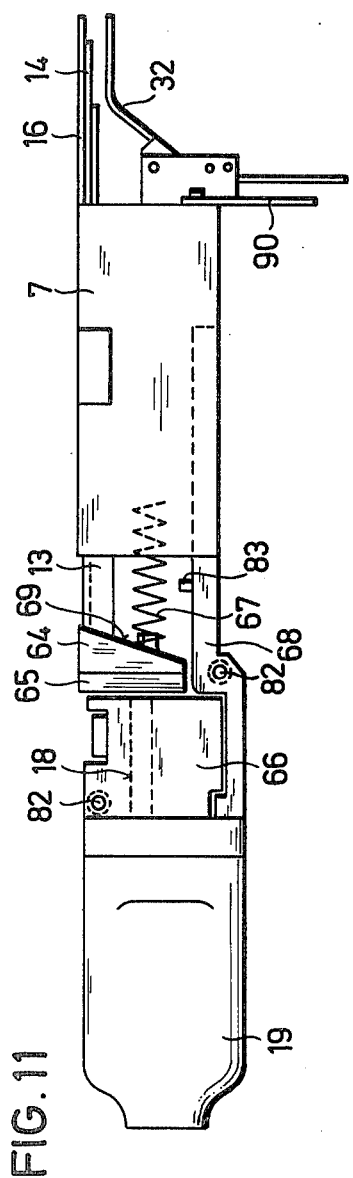
FIG. 11 is a plan view of the arrangement shown in FIG. 10.

The stop wedge 63 acts together with a counter-wedge 64, which represent essentially the double-wedge system (C). The wedge 64 is fastened to a connecting plate 65 on which there is also arranged the blade slide piece 13. The counter-wedge 64 is forced or pushed by a resetting spring 67 against a connecting block 66. The block 66 carries the cylinder 19 and is fixed, by a cylinder carrier 68, on the block 7 (FIGS. 10 and 11). When the cylinder 19 is activated, the piston 18 travels against the connecting plate 65 and thrusts this together with the counter-wedge 64 and the blade slide piece 13 against the force of the resetting spring 67 in the direction of the stop wedge 63. As soon as the wedge surfaces 69, 70 of the counter-wedge 64 and of the stop wedge 63 encounter one another, the stroke movement of the piston 18 and thereby that of the blade 14 is terminated.

The stop wedge 63 is shifted horizontally perpendicularly to the direction of the blade slide piece 13 before it strikes the counter-wedge 64, in each stripping operation. The lever system (B) serving for the shifting of the stop (impact) wedge 63 consists essentially of a lever bearing casing 71 which bears or carries a translation-angle lever 72 and a setting arm 73, as well as receiving the pressure piece 48. The setting arm 73 is coupled on its free end, by a carry-along pin 74, to the stop wedge 63.

Figure 12:
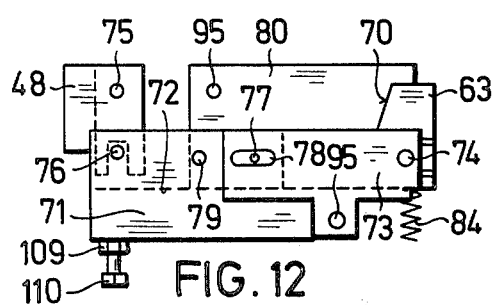
Figure 47:
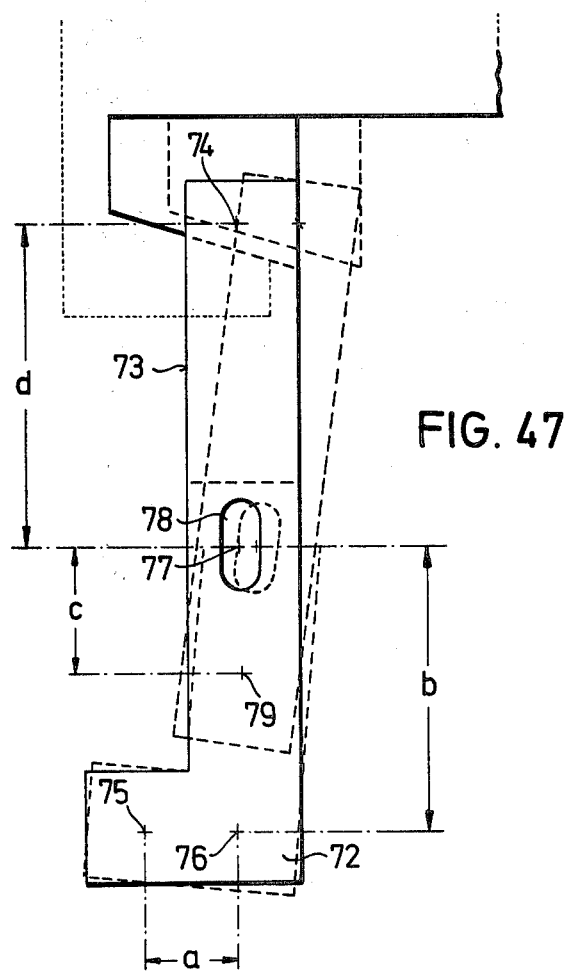
FIG. 47 shows a functional diagram of the lever system.

The manner of functioning of the lever system is indicated in FIGS. 47, in which the carry-along and transfer pins, which are to be seen in detail, for example, in FIG. 12, are replaced by crosses. The stroke of the setting lever 41 acts directly against the pressure piece 48, which is articulated by a carry-along pin 75 on the translation-angle lever 72. The translation-angle 72 is pivotably carried in the lever bearing casing 71 on the pivot pin 76. At the end zone of the long lever arm, the translation-angle lever 72 carries a carry-along pin 77, which extends through an oblong hole 78 provided in the setting arm 73. The setting arm 73 is arranged at one end to pivot on a pivot pin 79 mounted in the lever bearing casing 71, and carries on the other end the carry-along pin 74 which engages the stop wedge 63. If now the pressure piece 48 is turned by the setting lever 41, then a force acts on the translation-angle lever 72, so that the translation-angle lever 72 swings about the pivot pin 76 and swings the carry-along pin 77 therewith. The pin 77 moves within the oblong hole 78 and causes the setting arm 73 to swing about the pivot pin 79. The swinging of the setting arm 73 in turn causes, by the movement of the carry-along pin 74, a shifting of the stop wedge 63 perpendicularly to the direction of movement of the pressure piece 48. This shifting of the stop wedge 63 brings about an increase of the distance between the wedge surfaces of the wedges 63, 64, and thereby a lengthening of the stroke path for the blade 14. In FIG. 47 there is represented a preferred translation of the lever system of the device of the present invention approximately in scale. Here, the ratio of the lever arms a and b of the translation-angle lever 72 is preferably 1:3 and the ratio of the lever arms c and d of the setting arm 73 is preferably 1:3.75. This yields a total translation of 1:11.25 if, as the present invention preferably provides, the dimension for a=8 mm, for b=24 mm for c-10 mm and for d=37.5 mm. The translation according to the present invention offers, with an especially small measured construction, an optimal accuracy of adjustment for wires having an outside diameter of about 1 mm to about 3.5 mm.

Figure 3:
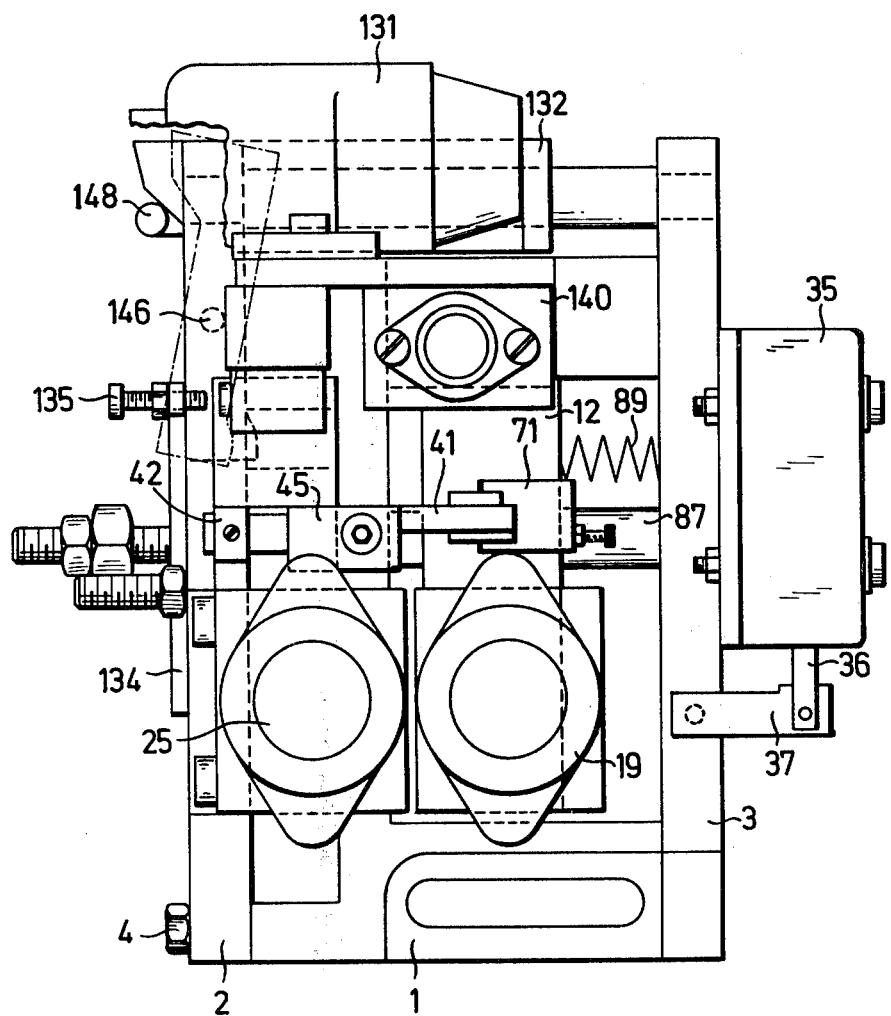
FIG. 3 is a side view taken in the direction of arrow II of FIG. 2.

FIG. 3 as well as FIGS. 6 to 9 show the interaction of the arrangement for scanning the particular wire outside diameter and the arrangement for setting the incision depth of the blade edges. It is of especial importance that the shifting of the stop wedge 63 by the lever system is completed when or before the counter-wedge 64 strikes with its wedge surface 69 upon the wedge surface 70 of the stop wedge 63. This can be achieved, for example, by means of the activation of the cylinder 19 taking place in a time delay after the activation of cylinder 25, or also by means of the stroke speed of the piston 24 being greater than that of the piston 18 by as much as the shifting time of the stop wedge 63 requires.

FIG. 10 shows a side view according to FIG. 9 taken in the direction of arrow X. In this FIG. 10, the fastening of the cylinder 19 by the cylinder carrier 68 to the block 7 is shown. FIG. 10 further shows the fastening plate 80 that carries the lever bearing casing 71. From the lever bearing casing 71, there projects on one side the pressure piece 48, and on the other side the setting arm 73 projects. The setting arm 73 carries the perpendicularly downward directed carry-along pin 74 which engages in a guide groove of the stop wedge 63. The stop wedge 63 abuts against the face side of block 7 with its back side and has a U-shaped groove 81 on the front side thereof, into which is engaged the fastening plate 80. On the right side of the block 7, as shown in FIG. 10, there are the angle lever 32, the blade 14, as well as the counter-blade 16. Bores 86 provided with bushings 85 receive guide bolts 87 (FIG. 4) for the reciprocation of the block 7 perpendicular to the blade slide piece movement, and the blind bores 88 receive the ends of resetting springs 89.

FIG. 11 shows a plan view according to FIG. 10, in which, for reasons of better understanding, the fastening plate 80 with lever bearing casing 71 and the stop wedge 63 were omitted. It is shown that the cylinder 19 is rigidly fastened to the block 7 by the connecting block 66 and the cylinder carrier 68. The connecting plate 65 with counter-wedge 64 and the blade slide piece 13 are pressed by the resetting spring 67 against the front end face of the connecting block 66. The threaded bores 82 in the connecting block 66 and the cylinder carrier 68 serve for the fastening of the fastening plate 80. A pin 83 facing the blade slide piece 13 receives a resetting spring 84 (FIG. 4) for acting against the stop wedge 63. A protective plate 90 is fastened to the block 7 and grips over the casing closure plate 3 to screen the chamber 6.

Figure 19:
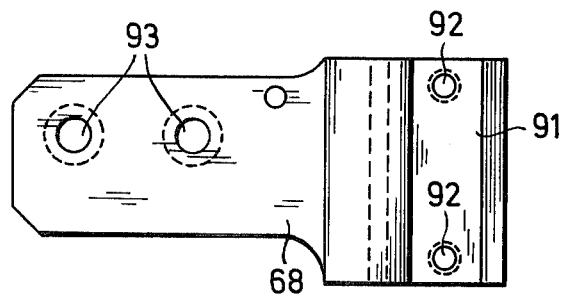
Figure 20:
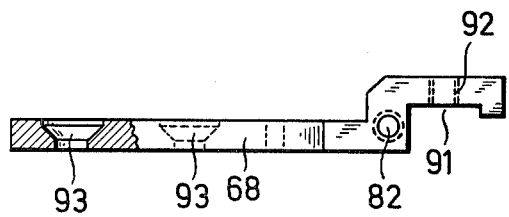

The cylinder carrier 68 is represented in FIGS. 19 and 20 in elevation and in plan views. It is formed approximately in an L-shape and has in the short shank a continuous U-shaped groove 91, into which the connecting block 66 engages. Threaded bores 92 in the groove bottom wall serve for the fixing, in screw fashion, of the connecting block 66. The countersunk bores 93 are arranged in the long shank of the carrier 68 to receive screws 94 for the fastening of the cylinder carrier 68 to the block 7.

The fastening plate 80 is represented in FIGS. 35 and 36 in plan view and in elevation view. It is constructed as an angle plate and has bores 95 which are arranged for alignment with the threaded bores 82 of the connecting block and the cylinder carrier 68. It has, further, countersunk bores 96 for receiving fasteners which screw into the lever bearing casing 71. The right border of the fastening plate 80, as shown, is provided above and below with a chamfering 97. The border zone provided with the chamferings 97 engages into the guide groove 81 of the stop wedge 63.

FIGS. 40 and 41 show the connecting plate 65 for the counter-wedge 64 as well as for the blade slide piece 13 represented in detail in FIGS. 42 to 44. The connecting plate 65 has a projection 98 which engages in closed linkage into an end recess 99 of the blade slide piece 13. The connecting plate 65 has, moreover, countersunk bores 100 for the lead-through of fastening screws that can be screwed into face-side threaded bores 101 of the blade slide piece 13. The blind bore 102 serves for the reception and one-end support of the resetting spring 67. Two bores 103 receive chuts, rods or pins for the fixing of the counter-wedge 64, which has corresponding counterbores 104, as shown in FIGS. 38, 39. The blade slide piece 13 is U-shaped in cross section. Inside the U-opening 105, there is seated the blade 14, which is held by a pin (not shown) that is engaged into the bore 106 of the blade slide piece 13, the blade 14 being fixed on this pin. The counter-wedge 64, which is represented in FIGS. 38, 39 in two views, consists preferably of plastic, being a pressure-resistant and impact-resistant plastic material which is undeformable in the zone of the load, being so prepared during its manufacture. The angle of inclination of the counter-wedge 64 amounts, in the example shown in FIG. 38, to 15°. In this case, the angle of inclination of the stop wedge 63 also amounts to 15°.

FIG. 12 shows in plan view the lever mechanism, and namely in detail the lever bearing casing 71, the pressure piece 48, the fastening plate 80, the translation-angle lever 72, the setting arm 73 and the stop wedge 63. Furthermore there is shown in FIG. 12 the arrangement of these parts with respect to one another, as well as the arrangement of the carry-along pins 75, 77 and 74, as well as that of the pivot pins 76 and 79. The guide lugs 107 of the pressure piece 48, represented separately in FIG. 34 to which reference should be made, receive the pivot pin 76 between them and thereby secure its position. The pressure piece 48 is pivotably borne with its bore 108 receiving the carry-along pin 75 of the translation-angle lever 72. The swinging movement, which the translation-angle lever 72 executes about the pivot pin 76 can be regulated by a setting screw 110 which is countered or held fast by a nut 109, the setting screw 110 being guided for longitudinal movement in the lever bearing casing 71 so that the screw 110 engages on the translation-angle lever 72.

Figure 13:
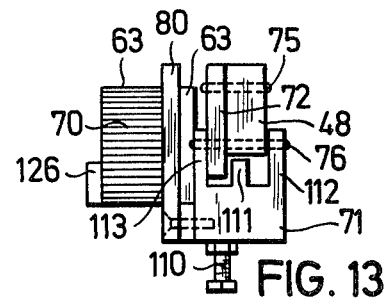

FIG. 13 shows a view of FIG. 12 turned 90° to the right. The lever bearing casing 71 has a central crosspiece 111 and two outside crosspieces 112, 113. Between the central crosspiece 111 and the outer crosspiece 113, there is seated the translation-angle lever 72 on the pivot pin 76 which connects the outer crosspieces 112, 113 with one another. The pressure piece 48 is aligned parallel to the translation-angle lever 72 and disposed between the lever 72 and the outer crosspiece 112, being borne on the carry-along pin 75. FIG. 13 shows further that the wedge surface of the stop wedge 63 is provided with grooves, the constructive formation of which is explained below with the aid of FIGS. 29 to 32.

Figure 14:
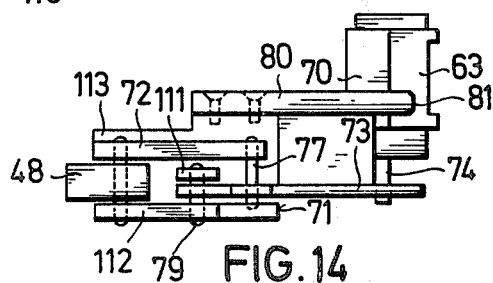

FIG. 14 represents a view according to FIG. 12 turned downward through 90°, in which it is shown that the setting arm 73 is borne on the pivot pin 79 between the crosspiece 111 and outer crosspiece 112. The connection of the translation-angle lever 72 with the setting arm 73 is made by the carry-along pin 77. In particular, it is noted from FIG. 14, that the fastening plate 80 engages into the groove 81 of the stop wedge 63.

Figure 15:
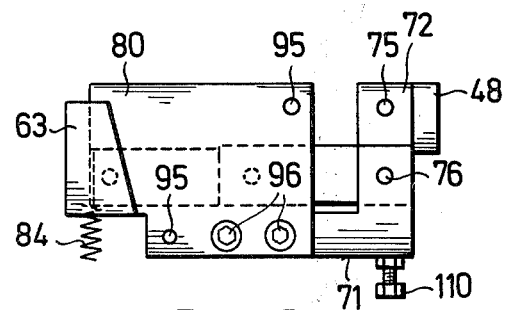
Figure 16:
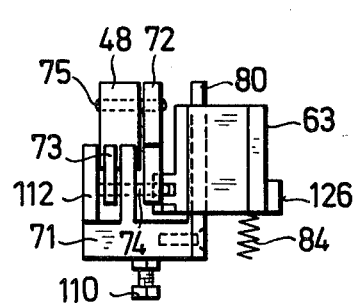

FIG. 15 shows a view according to FIG. 12 turned through 180° to the right, in which the fastening plate 80 with the bores 95, 96, the pressure piece 48, the translation-angle lever 72 as well as the stop wedge 63 are shown from underneath. FIG. 16 is a view according to FIG. 15 turned through 90° to the right.

FIG. 33 shows in plan view, the translation-angle lever 72 provided with a bore 114 for the carry-along pin 75, a bore 115 for the pivot pin 76, and a bore 116 for the carry-along pin 77. The bore 117 of the setting arm 73, represented in FIG. 37, serves for the lead-through of the pivot pin 79, the bore 118 is for the arrangement of the carry-along pin 74, and the oblong hole 78 is for the lead-through of the carry-along pin 77.

Figure 24:
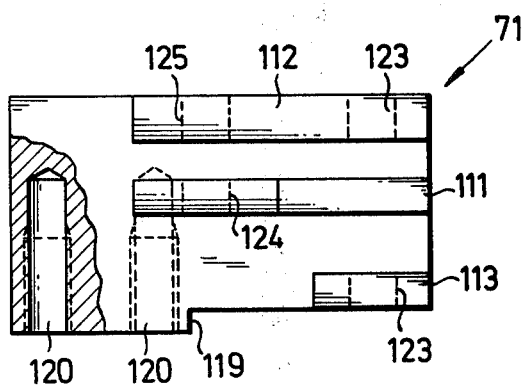
Figure 25:
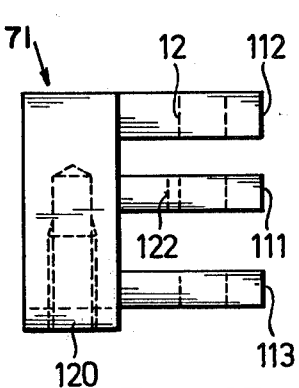
Figure 26:
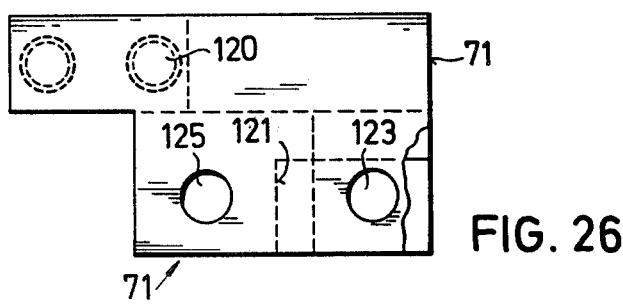

The lever bearing casing 71 is represented in FIGS. 24 to 26 in three views. FIG. 24 shows a projection 119 with threaded bores 120 to provide for screws for attachment onto the fastening plate 80. The central crosspiece 111 is stepped, the step raise 121 being approximately in the middle. The lower step 122 makes possible a positioning thereover of the pivot pin 76 which is installed in the bores 123 through the guide lugs 107 of the pressure piece 48, and thereby the arrangement of the pivot pin 76 between the outer crosspieces 112, 113. The middle crosspiece 111 has in its raised zone or step, a bore 124 which aligns with a bore 125 in the outer crosspiece 112. The bores 124, 125 serve for the reception of the pivot pin 79.

Figure 30:
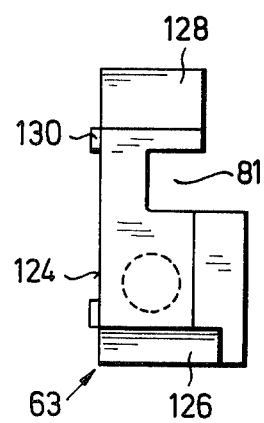
Figure 31:
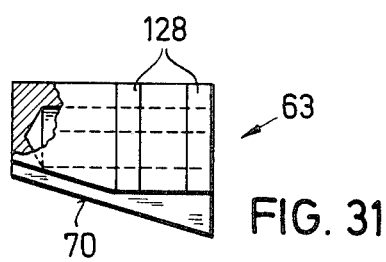

The stop wedge 63 has a U-shaped goove 81, into which the fastening plate 80 engages and which serves for guidance thereof. Immediately underneath the wedge groove 81, there is arranged the wedge surface 70, whose angle of 15° provided in the example represented, is shown in FIG. 31. At the lower end of the wedge surface 70, there is arranged an added material piece 126, whose boundary edge 127 lies against the blade slide piece 13 when the stop wedge 63 is not burdened by the lever system, but by the resetting spring 84. On the upper side, the stop wedge 63 carries two guide crosspieces 128 spaced from one another. The right guide crosspiece shown in FIG. 29 finishes off parallel with the wider face end of the wedge body. The guide crosspieces 128 receive between them the carry-along pin 74 that provides for the wedge shifting. FIG. 30 makes it evident that the stop wedge 63 has back portions 130 thereon to provide a continuous U-shaped recess 124. Thereby, there is created relatively small engagement surfaces between the stop wedge 63 and the face side of the block 7, in order to achieve a negligibly low friction in the shifting of the wedge.

Figure 32:
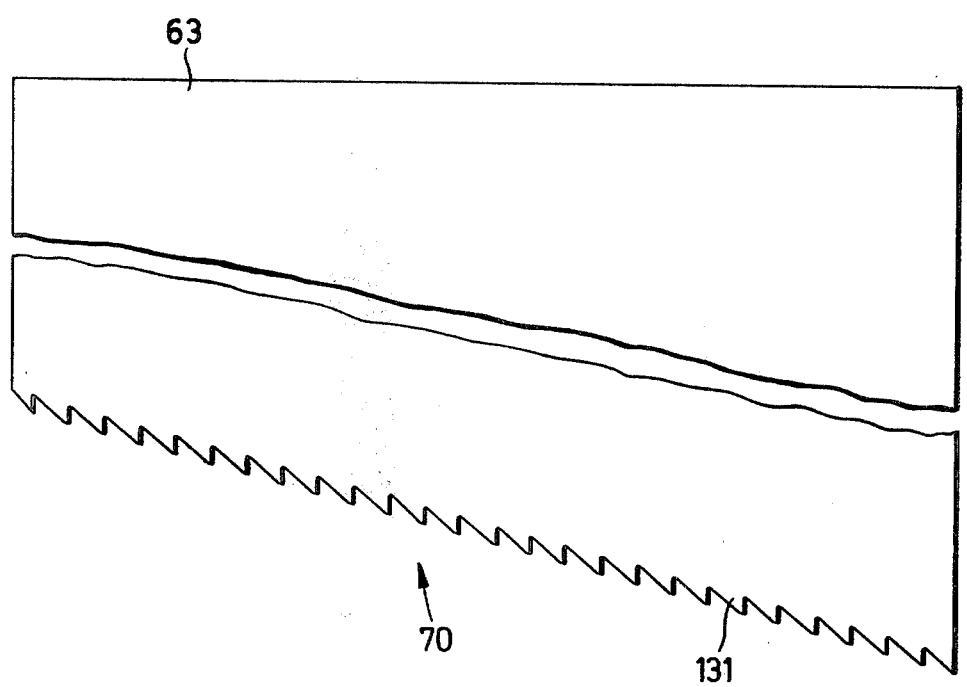

The wedge surfaces and angles of the wedges 63 and 64 are formed in such a way that preferably there is self-inhibition when the loads occur. The self-inhibition can be achieved with high coefficients of friction through suitable material selection in connection with the particular wedge angle. If the counter-wedge 64 consists preferably of pressure-stable plastic, then the material for the stop wedge is preferably steel. In order to achieve an especially high coefficient of friction, the wedge surface 70 of the stop wedge 63, as shown in FIG. 32, is provided with a dentation, while the counter-wedge surface 69 is formed smooth. The individual teeth 131 of surface 70 are arranged perpendicular to the oblique wedge plane and are barbed counter to the sliding direction of the wedges. The teeth 131 have preferably a tooth height of about 0.2 mm, a length of about 0.6 mm, and an angle of 35° between tooth face and back of each successive tooth. Preferably, the dentation is also provided on the wedge surface 126.

The functioning of the adjusting arrangement according to the present invention is as follows:

When the electric contacts of the end switch 35 activate the cylinder 25 as set forth above, the piston 24 travels out and moves the clamping jaws 10, 11 toward one another until they clamp the wire 15 firmly between them. With this clamping stroke, the coupling system (A) is also moved, where the setting lever 41 acts on the pressure piece 48 to bring about, by the lever system (B) described above in detail, a shifting of the stop wedge 63 horizontally and vertically perpendicularly to the direction of movement of the counter-wedge 64. Thereby the stroke path of the piston 18, which brings about the blade movement, is exactly predetermined, namely, by the spacing that the wedge surfaces 69, 70 of the wedges 63, 64 have in each case from one another.

The stop wedge 63 reaches its end position at the moment in which the clamping jaws 10, 11 have also completed their stroke movement. Thereby, only a slight time delay is necessary for the stroke of the piston 18 with respect to the stroke of the piston 24. The stroke of the piston 18 acts on the blade slide piece 13, so that the edges 21, 22 of the blades 14, 16 sever the insulation of the wire 15.

Figure 4:
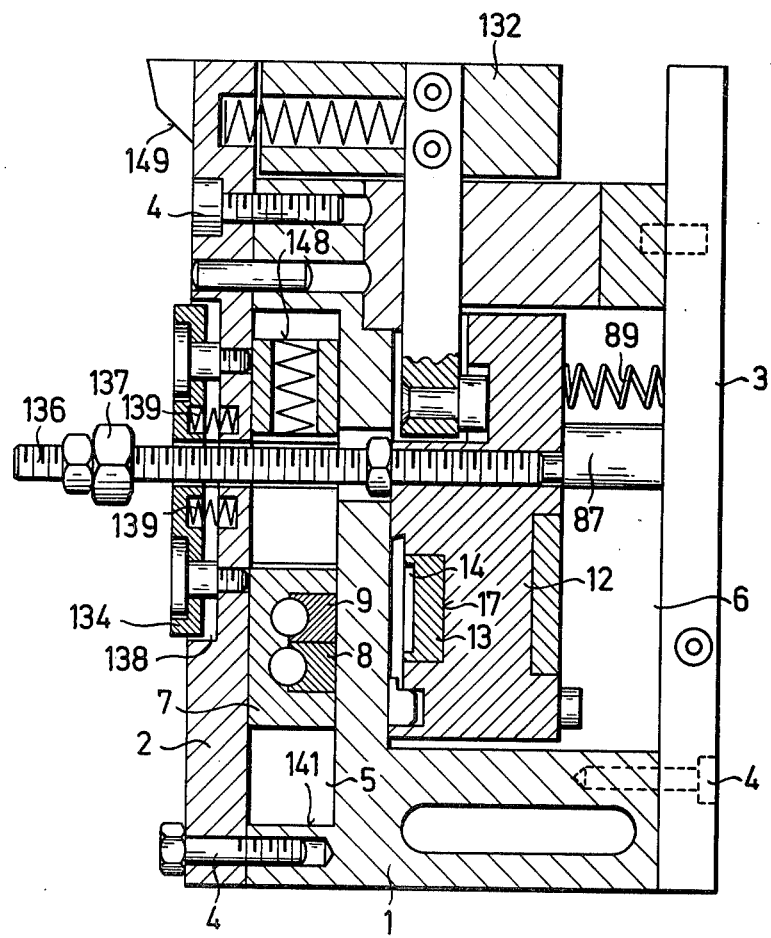
FIG. 4 is a sectional view taken along line III-IV of FIG. 2.
Figure 5:
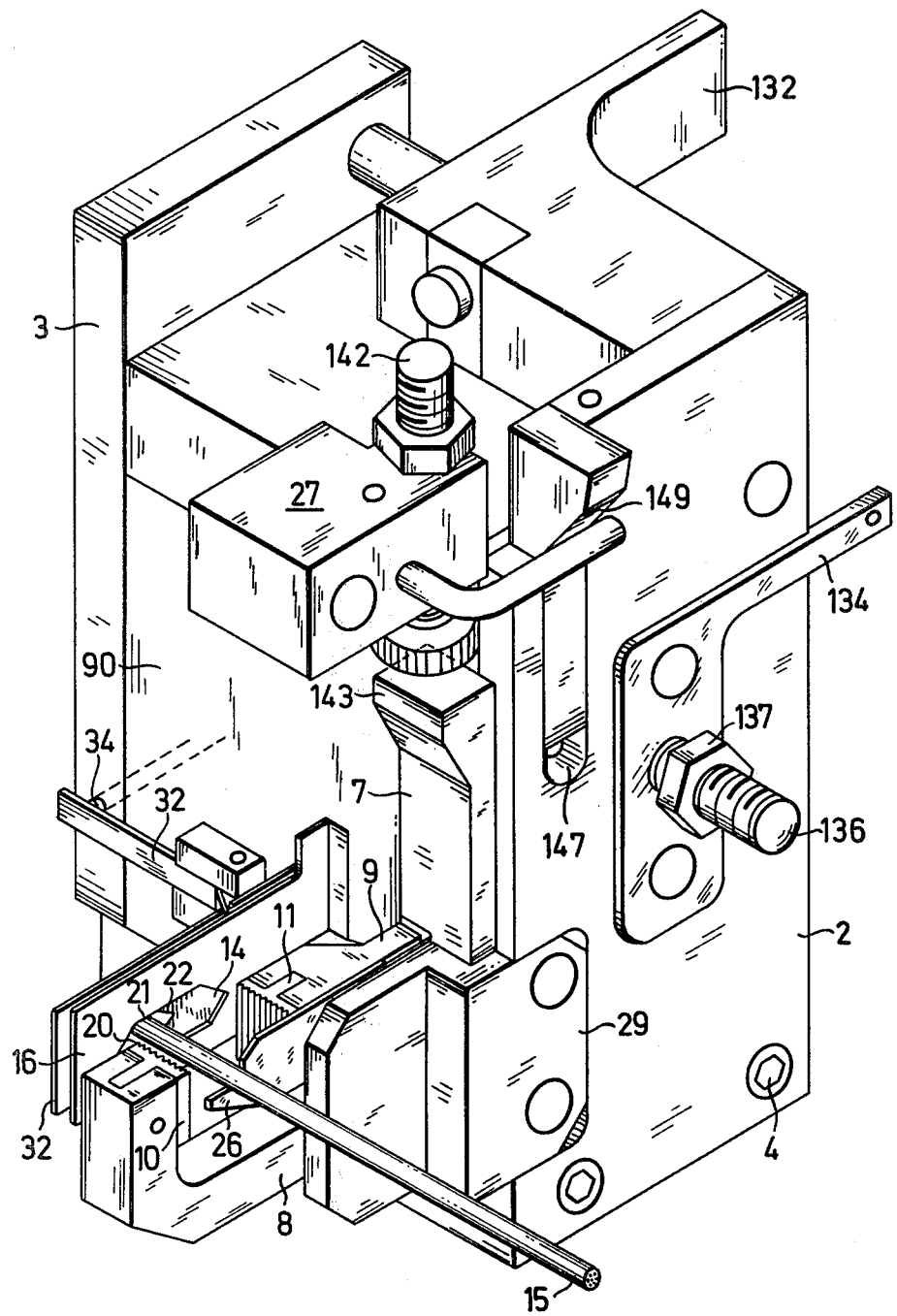
FIG. 5 is a perspective view of the stripping device shown in FIG. 1.

With the time delay, there is also activated the cylinder 131 provided for the insulation stripping arrangement, as shown in FIGS. 1-5. The pressure piece 132 transmits the movement of the cylinder 131 to the block 12, which carries the cylinder 19, the lever system (B), as well as the blades 14 and 16. The block 12 is thereby shifted in the direction of the rear casing closure plate 3 against the force of the resetting springs 89, FIG. 4, and simultaneously the insulation severed by the blades is striped by the blades from the end of the wire. The stripping movement is restricted by the contact triggering of a second electric end switch 133, which is acted on by a sensing arm 134 having an adjusting screw 135 installed in it. For the contact triggering, there is provided a countered nut 137 disposed on the threaded bolt 136 installed in the block 12, the bolt end protruding from the casing closure plate 2, as shown in FIG. 4. The nut 137, in the linear movement, draws the vertical part of the L-shaped sensing arm 134 against the casing closure plate 2.

For the reception of the sensing arm 134, there is arranged in the casing closure plate 2 a recess 138 taking into account the circumferential form of the arm 134. The sensing arm 134 is maintained at a distance from the casing closure plate 2 by the springs 139, and thereby from the end switch 133.

The end switch 35 is connected by a control cable (not shown) with the end switch 133, where the electric control of the device takes place by a relay station 140 (FIG. 3). When the contacts of the end switch 133 are closed by impingement of the setting screw 135, then the downward stroke of the working machine is initiated. In the lower dead point of the working machine stroke, the pistons 18, 24 of the cylinders 19 and 25, just as in the upper dead point of the working machine stroke of the piston of cylinder 131, travel back into their starting position. The clamping jaws 10, 11, the blade 14, the stop wedge 63 and also the stripper block 12 with its connected elements slide back into their starting position in consequence of the spring forces acting on them.

The block 7 is, borne with the elements connected to it, slidable up and down in a vertical direction. The guide groove for the block 7 is the front chamber 5 provided by the vertical wall of the casing base body 1 and the front casing closure plate 2. The downward movement of the block 7 against the force of the resetting springs 28 is limited by the wall 141 (FIG. 4) of the casing base body 1 and especially also by corresponding adjustment of the setting screw 142 (FIG. 1) connected to the pressure body 27. The screw 142 in the downward stroke, or the upward stroke of the connected impact machine, strikes the advanced cams 143 of the block 7.

Figure 2:
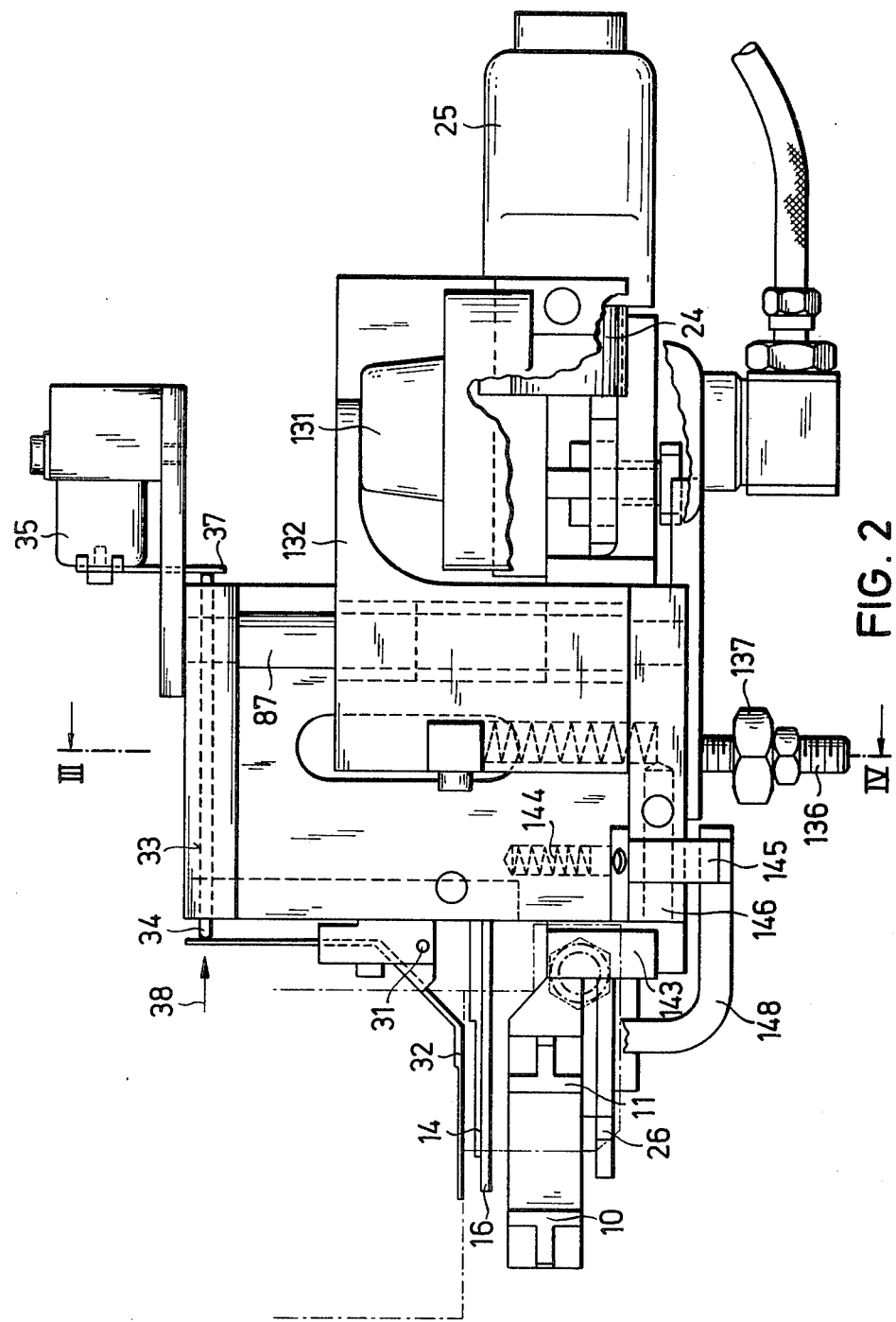
FIG. 2 is a plan view of the stripping device taken in the direction of arrow I of FIG. 1.

In the lower dead point of the movement of the block 7, a rest latch 145 standing under the pressure of the spring 144, is pivotably borne on the pin 146 (FIG. 2). The rest latch 145 snaps into place in the groove 147 cut in the casing closure plate 2 and is thereby set on the upper end 148 of the block 7. The blocking effect yielded from this is suspended as soon as the pressure body 27, in the downward stroke of the impact machine, descends with its carry-along member 148 in the run-on slope 149 of the rest latch 145.

The movement courses of the device are preferably controlled in such a way that the clamping jaws 10, 11 in the lower dead point of the working stroke of the machine, and thereby of the block 7, open again after the electrical connector on the stripped wire end has been struck. Thereby, the wire with struck connector can be conveniently removed from the relatively large working space. Shortly before the upper dead point of the stroke of the block 7, the cable rest 26 has also returned again into its basic position, so that the device stands ready for a following working cycle.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. Process for setting an incision depth in stripping electrical conductor wires with an impact applied thereto, said process comprising:
   automatically scanning an outside diameter of a conductor wire to be stripped, said scanning being a mechanical scanning performed by clamping jaw elements of an insulation stripping device;
   automatically adjusting the impact to be applied to the conductor wire according to a scanning value obtained from said scanning;
   transferring the scanning value from the clamping jaw elements through a coupling system to a lever system and from said lever system to a double wedge arrangement;
   using said wedge arrangement as a stop for the insulation stripping device; and
   shifting one wedge of the wedge arrangement relative to a counter-wedge of the wedge arrangement while maintaining a parallel relationship between base surfaces of the wedges to obtain a position for the stop.

2. Process according to claim 1, wherein said scanning and said adjusting is made before each cutting operation of the conductor wires.

3. Process according to claim 1, wherein a different scanning value is translated for each adjustment of the impact.

4. Process according to claim 1, including providing the double wedge arrangement with self-inhibition.

5. Process according to claim 1, including providing the lever system with a ratio of 1 to 11.25 and sloping the wedges with an angle of 15°.

6. A device for setting an incision depth in stripping electrical conductor wires, said device comprising:
   scanning means for automatically scanning an outside diameter of a conductor wire to be stripped for providing a scanning value, said scanning means including clamping jaw elements for clamping the conductor wire to determine said scanning value;
   adjusting means automatically adjusting an impact to be applied to the conductor wire during the stripping thereof, said adjusting means being adjusted according to said scanning value provided by said scanning means, said adjusting means including coupling means to transfer said scanning value from said scanning means to a lever system;
   said lever system including lever means for transmitting said scanning value to a double wedge arrangement; and said double wedge arrangement including wedge means to stop the stripping for a particular incision depth, said wedge means including a stop wedge and a counter-wedge, said lever means moving said stop wedge relative to said counter-wedge while maintaining a parallel relationship therebetween to obtain a position for the stop.

7. A device according to claim 6, wherein said counter-wedge is fabricated from a plastic material and said stop wedge is fabricated from steel.

8. A device according to claim 6, wherein said coupling means includes a carry-along block provided with a carry-along pin on a lower side thereof, a slide member connected to said scanning means and having a reception opening at one end, said carry-along pin being disposed in said reception opening for movement with said slide member, a guide rod guided in a guide casing, one end of said guide rod being connected to said carry-along block, an opposite enlarged end of said guide rod having a setting lever springly secured thereto, said setting lever engaging said lever means.

9. A device according to claim 8, wherein said carry-along block is provided with a continuous U-shaped groove for receiving said guide rod, first screw means for securing said guide rod in said U-shaped groove, and adjustment screw means provided on said carry-along block for engaging said first screw means to adjust position of said guide rod relative to said carry-along block.

10. A device according to claim 6, wherein said lever means includes a lever bearing casing for mounting a pressure piece member, a translation-angle lever and a setting arm for coaction therebetween, said pressure piece member engaging said coupling means, and said setting arm engaging said wedge means.

11. A device according to claim 10, wherein said pressure piece member pivots on a first carry-along pin secured to said translation-angle lever, said translation-angle lever pivoting on a first pivot pin secured to said lever bearing casing, said translation-angle lever being provided with a second carry-along pin at one end thereof, said setting arm having an oval hole for receiving said second carry-along pin, said setting arm pivoting on a second pivot pin secured to said lever bearing casing, said setting arm being provided with a third carry-along pin at one end thereof for engaging said stop wedge of said wedge means.

12. A device according to claim 6, wherein said stop wedge has a U-shaped groove and a wedge surface with an added material piece providing a boundary edge facing said counter-wedge, said stop wedge being provided with two guide crosspieces for receiving said lever means, and a recess provided on a back portion of said stop wedge for providing a small engagement surface to obtain low friction forces in shifting said stop wedge.

13. A device according to claim 12, wherein said wedge surface of said stop wedge is provided with a barb-shaped dentation.

* * * * *